(12) United States Patent
Sui et al.

(10) Patent No.: US 8,919,207 B2
(45) Date of Patent: Dec. 30, 2014

(54) FLOW MEASURING DEVICE AND METHOD USING TRANSMISSION PATHS HAVING DIFFERENT ANGLES

(75) Inventors: Lei Sui, Andover, MA (US); James Michael Korba, Woburn, MA (US); Toan Huu Nguyen, Needham, MA (US); Generoso Polcaro, Groton, MA (US)

(73) Assignee: General Electric Company, Schenectady, NY (US)

( * ) Notice: Subject to any disclaimer, the term of this patent is extended or adjusted under 35 U.S.C. 154(b) by 374 days.

(21) Appl. No.: 13/347,232

(22) Filed: Jan. 10, 2012

(65) Prior Publication Data

US 2013/0174669 A1 Jul. 11, 2013

(51) Int. Cl.
*G01F 1/66* (2006.01)

(52) U.S. Cl.
USPC ............... 73/861.27; 73/861.29; 73/861.31

(58) Field of Classification Search
None
See application file for complete search history.

(56) References Cited

U.S. PATENT DOCUMENTS

| | | | | | |
|---|---|---|---|---|---|
| 4,545,244 | A | * | 10/1985 | Yasuda et al. | 73/861.28 |
| 5,437,194 | A | * | 8/1995 | Lynnworth | 73/861.27 |
| 5,546,813 | A | * | 8/1996 | Hastings et al. | 73/861.29 |
| 5,705,753 | A | * | 1/1998 | Hastings et al. | 73/861.28 |
| 6,293,156 | B1 | * | 9/2001 | Shen et al. | 73/861.26 |
| 6,487,916 | B1 | * | 12/2002 | Gomm et al. | 73/861.29 |
| 6,595,071 | B1 | * | 7/2003 | Doten | 73/861.29 |
| 6,634,239 | B2 | * | 10/2003 | Gomm et al. | 73/861.27 |
| 7,159,472 | B1 | * | 1/2007 | Hastings et al. | 73/861.27 |
| 7,213,468 | B2 | * | 5/2007 | Fujimoto | 73/861.27 |
| 7,658,114 | B1 | * | 2/2010 | Sui et al. | 73/861.27 |
| 7,934,432 | B2 | * | 5/2011 | Kuhn et al. | 73/861.28 |
| 2010/0005902 | A1 | * | 1/2010 | Iwanaga et al. | 73/861.27 |

* cited by examiner

*Primary Examiner* — Harshad R Patel
(74) *Attorney, Agent, or Firm* — Hiscock & Barclay LLP

(57) ABSTRACT

A multimode flow meter can use both the time-of-transit of upstream and downstream ultrasonic signals and time for transmission of downstream-only signals to determine a flow velocity of a medium flowing through a conduit. Based on factors, such as previously computed flow velocity and signal-to-noise ratio of the upstream signal, a mode of operation may be switched and only the time for transmission of the downstream signals may be used to determine flow velocity. The multimode flow meter can compute cross-flow to reduce its effect on the determination of flow velocity.

17 Claims, 1 Drawing Sheet

FLOW MEASURING DEVICE AND METHOD USING TRANSMISSION PATHS HAVING DIFFERENT ANGLES

BACKGROUND OF THE INVENTION

The subject matter disclosed herein relates to the determination of flow velocity, including flow velocity of gas, liquid, or a multiphase medium flowing through a conduit.

BACKGROUND OF THE INVENTION

Ultrasonic flow meters are used to measure the flow velocity of a medium, such as gas, flowing through a conduit. A transit-time or time-of-flight ultrasonic flow meter uses the time of travel for both an ultrasonic upstream signal (defined to be substantially against the flow of the medium) and downstream ultrasonic signal (in the opposite direction as upstream) between the two transceivers to determine the flow velocity of the medium in the conduit.

Downstream signals normally produce better signal-to-noise ratio (SNR) than upstream signals, especially at high flow velocities. That is, the upstream ultrasonic signal has lower signal-to-noise ratio (SNR) than the downstream ultrasonic signal, especially as the velocity of the flow of the medium increases. A downstream only flow meter uses downstream signals transmitted by two ultrasonic emitters to two receivers to measure the flow velocity of the medium.

BRIEF DESCRIPTION OF THE INVENTION

According to one aspect of the invention, a flow meter determines a flow velocity of a medium. The ultrasonic flow meter includes a first ultrasonic transceiver configured to transmit a first signal along a first transmission path, the first transmission path being downstream relative to a flow direction of the medium, and the first transmission path extending at a first angle from the flow direction of the medium; a second ultrasonic transceiver configured to receive the first signal transmitted by the first ultrasonic transceiver and to transmit a second signal along a second transmission path, the second transmission path being upstream relative to the flow direction of the medium, the second signal being transmitted to the first ultrasonic transceiver, and the second transmission path extending at the first angle from the flow direction of the medium; an ultrasonic emitter configured to transmit a third signal along a third transmission path, downstream of the flow direction of the medium, the third transmission path forming a second angle with the flow direction of the medium, wherein the first angle and the second angle are different; and an ultrasonic receiver configured to receive the third signal from the ultrasonic emitter. The flow velocity of the medium is calculated according to at least one of a first set of a first time of arrival of the first signal from the first ultrasonic transceiver to the second ultrasonic transceiver, a second time of arrival of the second signal from the second ultrasonic transceiver to the first ultrasonic transceiver, and a third time of arrival of the third signal from the ultrasonic emitter to the ultrasonic receiver, and a second set of the first time of arrival and the third time of arrival based on a selection of a mode of operation.

According to another aspect of the invention, a system determines flow velocity of a medium. The system includes a first ultrasonic transceiver configured to transmit a first signal along a first transmission path, the first transmission path being downstream relative to a flow direction of the medium, and the first transmission path extending at a first angle from the flow direction of the medium; a second ultrasonic transceiver configured to receive the first signal transmitted by the first ultrasonic transceiver and to transmit a second signal along a second transmission path, the second transmission path being upstream relative to the flow direction of the medium, the second signal being transmitted to the first ultrasonic transceiver, and the second transmission path extending at the first angle from the flow direction of the medium; an ultrasonic emitter configured to transmit a third signal along a third transmission path, the third transmission path being downstream relative to the flow direction of the medium, and the third transmission path extending at a second angle from the flow direction of the medium, wherein the first angle and the second angle are different; an ultrasonic receiver configured to receive the third signal from the ultrasonic emitter; a calculator configured to determine the flow velocity of the medium according to at least one of a first mode of operation by using a first time of arrival of the first signal from the first ultrasonic transceiver to the second ultrasonic transceiver, a second time of arrival of the second signal from the second ultrasonic transceiver to the first ultrasonic transceiver, and a third time of arrival of the third signal from the ultrasonic emitter to the ultrasonic receiver, and a second mode of operation using the first time of arrival and the third time of arrival based on a selection of a mode of operation; and a mode selector configured to select the mode of operation.

According to yet another aspect of the invention, a method determines flow velocity of a medium. The method includes transmitting a first signal along a first transmission path, the first transmission path being downstream relative to a flow direction of the medium, and the first transmission path extending at a first angle from the flow direction of the medium; transmitting a second signal along a second transmission path, the second transmission path being upstream relative to the flow direction of the medium, and the second transmission path extending at the first angle from the flow direction of the medium; transmitting a third signal along a third transmission path, the third transmission path being downstream relative to the flow direction of the medium, and the third transmission path extending at a second angle from the flow direction of the medium, wherein the first angle and the second angle are different; selecting a first mode of operation or a second mode of operation, the first mode of operation being a default mode of operation; and determining the flow velocity of the medium according to a first time of arrival of the first signal, a second time of arrival of the second signal, and a third time of arrival of the third signal when the first mode of operation is selected, and according to the first time of arrival and the third time of arrival when the second mode of operation is selected.

BRIEF DESCRIPTION OF THE DRAWING

The drawings are not necessarily to scale, emphasis instead generally being placed on illustrating the principles of the invention. Like numerals are used to indicate like parts throughout the various views.

DETAILED DESCRIPTION OF THE INVENTION

Figure 1:
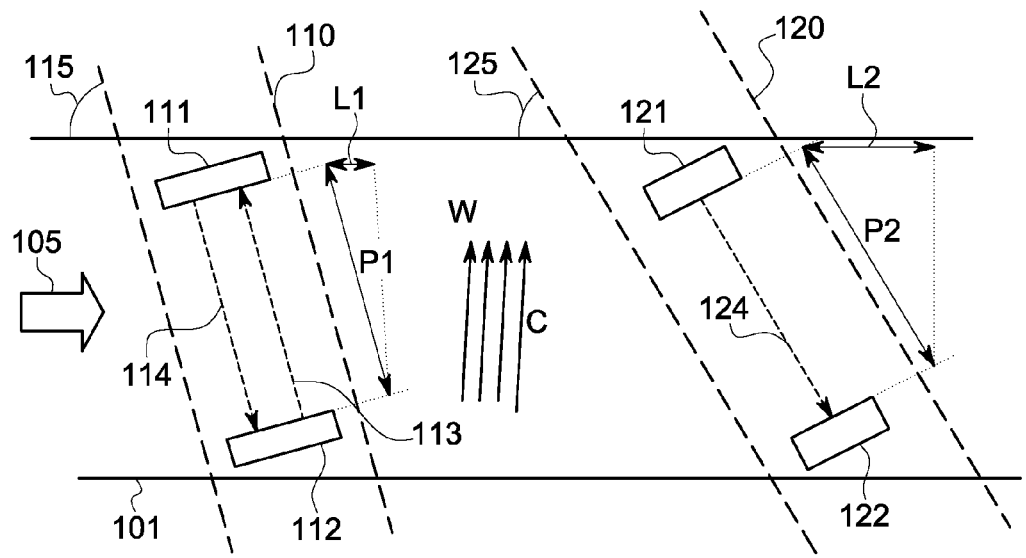
FIG. 1 schematically illustrates an ultrasonic flow meter with two paths, according to an embodiment of the invention.

FIG. 1 schematically illustrates an ultrasonic flow meter with two paths 110, 120 according to an embodiment of the invention. The path 110 is formed by a transceiver pair 111, 112 that transmit an upstream signal 113 and a downstream signal 114 to each other. The path of travel of the upstream and downstream signals 113, 114 forms an angle 115 with the direction of flow of the medium 105. That is, the path of travel of the signals 113, 114 extends at an angle 115 from the direction of flow of the medium 105. The path 120 is formed by an emitter 121 that transmits a downstream signal 124 to a receiver 122. The path of travel of the downstream signal 124 forms an angle 125 with the direction of flow of the medium 105. That is, the path of travel of the downstream signal 124 extends at an angle 125 from the direction of flow of the medium 105. Based on the angles 115, 125 corresponding to the two paths 110, 120, the path lengths of the signals 113, 114 associated with path 110 are shorter than the path length of the signal 124 associated with path 120. Accordingly, path 110 is chosen as the path in which to include the upstream signal 113, because the shorter path length of path 110 results in a higher SNR for the upstream signal 113 than if an upstream signal were part of path 120.

The paths 110, 120, as showing FIG. 1, are formed by transceivers 111, 112, an emitter 121, and a receiver 122 that are wetted transducers, which penetrate the conduit 101, as indicated by the dashed lines denoting paths 110 and 120, unlike clamp-on transducers. While clamp-on transducers are also contemplated to form the paths 110, 120, wetted transducers can provide a more accurate indication of the flow velocity of the medium 105 by eliminating relative movement between the paths 110, 120 (changes in the angles 115, 125) during installation. The exemplary transceivers 111, 112 and emitter 121 may be driven by a 4-cycle square wave centered at, for example, 100 kHz with an amplitude of 200V peak-to-peak.

Flow velocity of the medium 105 can be determined from the time ($t_{113}$) of transit of the upstream signal 113 and time of transit ($t_{114}$) of the downstream signal 114 in the following way:

$$V=(P1^2/2*L1)*((t_{113}-t_{114})/(t_{113}-t_{114}))$$ [EQ 1]

where

V=flow velocity of the medium 105,
P1=path length of the upstream and downstream signals 113, 114
L1=path length, P1, projected along the axial direction of the conduit 101

Flow velocity of the medium 105 can also be determined from the time ($t_{114}$, $t_{124}$) of transit of each of the downstream signals 114, 124 in the following way:

$$V=((P1/t_{114})-(P2/t_{124}))/(\cos(115)-\cos(125))$$ [EQ 2]

and $$c=(((P1/t_{114})*\cos(125))-(P2/t_{124})*\cos(115)))/(\cos(125)-\cos(115))$$ [EQ 3]

where

V=flow velocity of the medium 105,
c=speed of sound through the medium 105,
P1, P2=path length of the downstream signals 114, 124, respectively
L1, L2=path length, P1 and P2, respectively, projected along the axial direction of the conduit 101

As indicated by the denominators of EQ 2 and EQ 3 above, the angles 115 and 125 of the two paths 110, 120 with the cross-sectional line of the conduit 101 cannot be the same (denominator of EQ 2 and EQ 3 would be 0).

When used together, the two paths 110, 120 allow both transit-time and downstream-only determination of flow velocity. As such, the combination can increase turn down ratio (range of measurement) and accuracy of the computed flow velocity value. When both paths 110, 120 are fully used (upstream signal 113 and downstream signals 114, 124), the velocity values determined by each path 110, 120 are averaged to increase accuracy of the flow velocity output. When both paths 110, 120 are fully used but the upstream signal 113 is diminishing (SNR decreasing), then the velocity values determined by using the upstream 113 and downstream 114 signals and by using the downstream only signals 114, 124 act as a cross-check. The combination of the paths 110, 120 also allows computation and mitigation of cross-flow, which cannot be computed by a transit-time flow meter or downstream-only flow meters alone.

Cross-flow is circulating flow (rather than strictly axial flow) of the medium 105. Cross-flow may be caused by a thermal effect, for example, which causes stratification of the medium 105. That is, one side (the bottom, for example) of the conduit 101 may be hotter than other parts of the conduit 101, thereby creating a thermal effect that causes circulating flow of the medium 105 in addition to axial flow. This circulating flow can interfere with the time of transit of an ultrasonic signal through the medium 105 ($t_{113}$, $t_{114}$, $t_{124}$) and thereby reduce the accuracy of the computed flow velocity (V). Because using a combination of the flow meters 110, 120 provides three different time measurements ($t_{113}$, $t_{114}$, $t_{124}$) and three equations with two unknowns (V, c), the combined flow meters 110, 120 can together be used to compute cross-flow (W) as a third unknown.

Specifically, by employing both the upstream 113 and downstream 114 signals of the path 110 and also the downstream signal 124 of the path 120, the following three equations could be used to solve for flow velocity (V), speed of sound (c) in the medium 105, and cross-flow (W) upon measuring transit times ($t_{113}$, $t_{114}$, $t_{124}$) of the signals 113, 114, 124:

$$t_{113}=P1/(c-V*\cos(115)+W*\sin(115))$$ [EQ 4]

$$t_{114}=P1/(c+V*\cos(115)-W*\sin(115))$$ [EQ 5]

$$t_{124}=P2/(c+V*\cos(125)-W*\sin(125))$$ [EQ 6]

By using EQ 4 through EQ 6, above, the cross-flow element (W) can be accounted for in the determination of the flow velocity (V), according to the following:

$$W=\{2*P2*\cos(115)/t_{124}-P1*[\cos(125)+\cos(115)]/t_{114}+P1*[\cos(125)-\cos(115)]/t_{113}\}/\{2*\sin(115)*[\cos(125)-\cos(115)]\}$$ [EQ 7]

Figure 2:
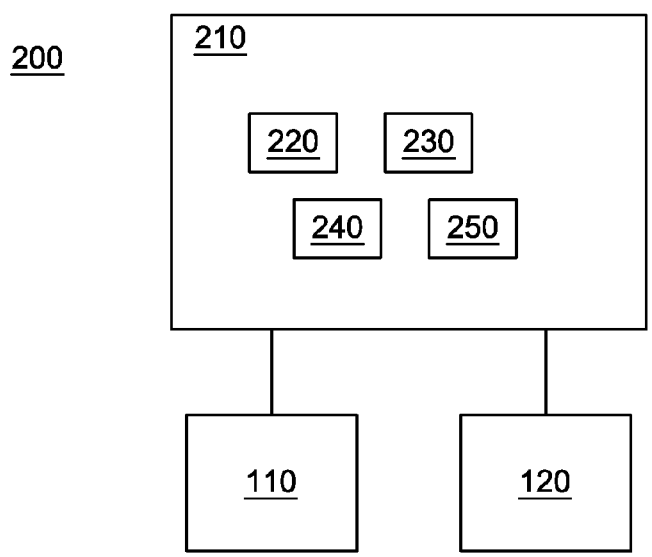
FIG. 2 is a block diagram of a multimode flow meter system according to an embodiment of the invention.

FIG. 2 is a block diagram of the multimode flow meter system 200 according to an embodiment of the invention. The multimode flow meter system 200 of FIG. 2 includes a controller 210 in communication with the paths 110, 120 shown at FIG. 1. The exemplary controller 210 includes a mode selector 220, a calculator 230, a user interface 240, and a display 250. Although shown together, the elements of the controller 210 may be housed separately and in communication with each other. In addition, one or more memory devices and the one or more processors that are understood to be part of the controller 210 are not shown. The calculator 230 computes flow velocity of the medium 105 based on a mode of operation determined by the mode selector 220. The mode selector 220 may select the mode of operation based on user input through the user interface 240 or based on an interaction with the calculator 230 and predetermined rules. As a default, the calculator 230 may use EQ 1 and EQ 2 to determine flow velocity of the medium 105 on a continual, periodic, or user-selected basis. Exemplary bases by which the mode selector 420 may change the default mode of operation are discussed below.

The calculated flow velocity may be indicated to a user through the display 250. If the calculated flow velocity exceeds either a user-input or predetermined limit, such as, for example, 230 ft/sec, the mode selector 220 may switch the mode of operation by instructing the calculator 230 to use only EQ 2 in the calculation of the flow velocity. If a subsequent calculation indicates that the flow velocity has dropped below 230 ft/sec, the mode selector 220 may switch the mode of operation back to the default mode of using both EQ 1 and EQ 2.

In one embodiment, the SNR is indicated to a user through the display 250. If the SNR of the upstream signal 113 drops to or below a user-input or predetermined limit, such as, for example, 55, the mode selector 220 switches the mode of operation by instructing the calculator 230 to use only EQ 2 in the calculation of the flow velocity. If a subsequent determination indicates that the SNR has increased above 55, the mode selector 220 switches the mode of operation back to the default mode.

In another embodiment, the user input through the user interface 240 may be used to directly change the mode of operation rather than indirectly through the selection of limits of flow velocity or SNR as a basis for a change of the mode of operation by the mode selector 220.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A flow meter to determine a flow velocity of a medium, comprising:
   a first ultrasonic transceiver configured to transmit a first signal along a first transmission path, the first transmission path being downstream relative to a flow direction of the medium, and the first transmission path extending at a first angle from the flow direction of the medium;
   a second ultrasonic transceiver configured to receive the first signal transmitted by the first ultrasonic transceiver and to transmit a second signal along a second transmission path, the second transmission path being upstream relative to the flow direction of the medium, the second signal being transmitted to the first ultrasonic transceiver, and the second transmission path extending at the first angle from the flow direction of the medium;
   an ultrasonic emitter configured to transmit a third signal along a third transmission path, the third transmission path being downstream relative to the flow direction of the medium, and the third transmission path extending at a second angle from the flow direction of the medium, wherein the first angle and the second angle are different; and
   an ultrasonic receiver configured to receive the third signal from the ultrasonic emitter, wherein
   the flow velocity of the medium is calculated according to at least one of a first set of a first time of arrival of the first signal from the first ultrasonic transceiver to the second ultrasonic transceiver, a second time of arrival of the second signal from the second ultrasonic transceiver to the first ultrasonic transceiver, and a third time of arrival of the third signal from the ultrasonic emitter to the ultrasonic receiver, and a second set of the first time of arrival and the third time of arrival based on a selection of a mode of operation.

2. A system to determine flow velocity of a medium, comprising:
   a first ultrasonic transceiver configured to transmit a first signal along a first transmission path, the first transmission path being downstream relative to a flow direction of the medium, and the first transmission path extending at a first angle from the flow direction of the medium;
   a second ultrasonic transceiver configured to receive the first signal transmitted by the first ultrasonic transceiver and to transmit a second signal along a second transmission path, the second transmission path being upstream relative to the flow direction of the medium, the second signal being transmitted to the first ultrasonic transceiver, and the second transmission path extending at the first angle from the flow direction of the medium;
   an ultrasonic emitter configured to transmit a third signal along a third transmission path, the third transmission path being downstream relative to the flow direction of the medium, and the third transmission path extending at a second angle from the flow direction of the medium, wherein the first angle and the second angle are different;
   an ultrasonic receiver configured to receive the third signal from the ultrasonic emitter;
   a calculator configured to determine the flow velocity of the medium according to at least one of a first mode of operation by using a first time of arrival of the first signal from the first ultrasonic transceiver to the second ultrasonic transceiver, a second time of arrival of the second signal from the second ultrasonic transceiver to the first ultrasonic transceiver, and a third time of arrival of the third signal from the ultrasonic emitter to the ultrasonic receiver, and a second mode of operation using the first time of arrival and the third time of arrival based on a selection of a mode of operation; and
   a mode selector configured to select the mode of operation.

3. The system according to claim 2, wherein the mode selector interacts with a user interface to determine the mode of operation based on a user input.

4. The system according to claim 2, wherein the mode selector selects the mode of operation based on a signal-to-noise ratio (SNR) of the second signal.

5. The system according to claim 4, wherein the mode selector selects the second mode of operation when the SNR of the second signal is less than or equal to 55.

6. The system according to claim 2, wherein the mode selector selects the mode of operation based on a previous calculation of the flow velocity of the medium.

7. The system according to claim 6, wherein the mode selector selects the second mode of operation when the previous calculation of the flow velocity of the medium exceeds 230 ft/sec.

8. The system according to claim 2, wherein the calculator is further configured to determine cross-flow and factor out the cross-flow from the determination of the flow velocity of the medium in the first mode of operation.

9. The system according to claim 8, wherein the calculator solves the following three equations to determine the flow velocity of the medium (V), the cross-flow (W), and speed of sound in the medium (c):

$$t1\text{-down} = P1/(c + V^*\cos\alpha - W^*\sin\alpha)$$

$$t1\text{-up} = P1/(c - V^*\cos\alpha + W^*\sin\alpha)$$

$$t2\text{-down} = P2/(c + V^*\cos\beta - W^*\sin\beta), \text{ where}$$

α=the first angle,
β=the second angle,
P1=distance of the first and the second transmission paths,
t1-down=the first time of arrival,
t1-up=the second time of arrival,
P2=distance of the third transmission path, and
t2-down=the third time of arrival.

10. A method of determining flow velocity of a medium, comprising:
    transmitting a first signal along a first transmission path, the first transmission path being downstream relative to a flow direction of the medium, and the first transmission path extending at a first angle from the flow direction of the medium;
    transmitting a second signal along a second transmission path, the second transmission path being upstream relative to the flow direction of the medium, and the second transmission path extending at the first angle from the flow direction of the medium;
    transmitting a third signal along a third transmission path, the third transmission path being downstream relative to the flow direction of the medium, and the third transmission path extending at a second angle from the flow direction of the medium, wherein the first angle and the second angle are different;
    selecting a first mode of operation or a second mode of operation, the first mode of operation being a default mode of operation; and
    determining the flow velocity of the medium according to a first time of arrival of the first signal, a second time of arrival of the second signal, and a third time of arrival of the third signal when the first mode of operation is selected, and according to the first time of arrival and the third time of arrival when the second mode of operation is selected.

11. The method according to claim 10, wherein the selecting is based on a user input.

12. The method according to claim 10, wherein the selecting is based on a signal-to-noise ratio (SNR) of the second signal.

13. The method according to claim 12, wherein the second mode of operation is selected when the SNR of the second signal is less than 55.

14. The method according to claim 10, wherein the selecting is based on a previous calculation of the flow velocity of the medium.

15. The method according to claim 14, wherein the second mode of operation is selected when the previous calculation of the flow velocity of the medium exceeds 230 ft/sec.

16. The method according to claim 10, further comprising:
    determining a cross-flow component to factor out the cross-flow component from the determining of the flow velocity of the medium.

17. The method according to claim 16, wherein the determining the cross-flow component (W), the flow velocity of the medium (V), and speed of sound in the medium (c) comprises solving the following three equations:

$$t1\text{-down} = P1/(c + V^*\cos\alpha - W^*\sin\alpha)$$

$$t1\text{-up} = P1/(c - V^*\cos\alpha + W^*\sin\alpha)$$

$$t2\text{-down} = P2/(c + V^*\cos\beta - W^*\sin\beta), \text{ where}$$

α=the first angle,
β=the second angle,
P1=distance of the first and the second transmission paths,
t1-down=the first time of arrival,
t1-up=the second time of arrival,
P2=distance of the third transmission path, and
t2-down=the third time of arrival.

* * * * *